B. B. CONRAD.
NUMBERING MACHINE.
APPLICATION FILED APR. 17, 1908.

905,987.

Patented Dec. 8, 1908.
7 SHEETS—SHEET 1.

Witnesses:
C. A. Jarvis
Mabel Pittenhofer

Inventor:
Benjamin B. Conrad.
By Chrystie and Wright
Attorneys.

B. B. CONRAD.
NUMBERING MACHINE.
APPLICATION FILED APR. 17, 1908.
905,987.
Patented Dec. 8, 1908.
7 SHEETS—SHEET 2.
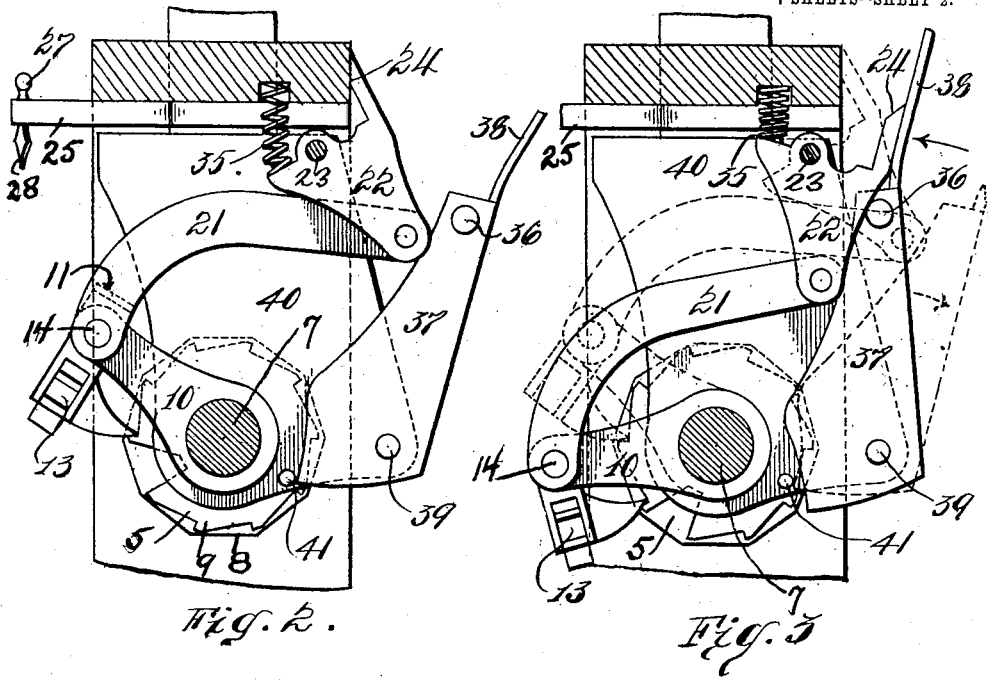
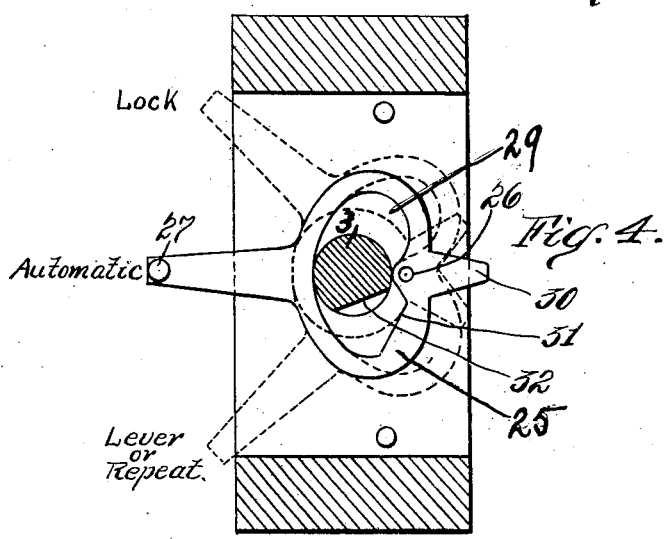
Witnesses:
C. A. Jarvis
Mabel Pittenhoefer
Inventor
Benjamin B. Conrad
By Chrystie and Wright
Attorneys.

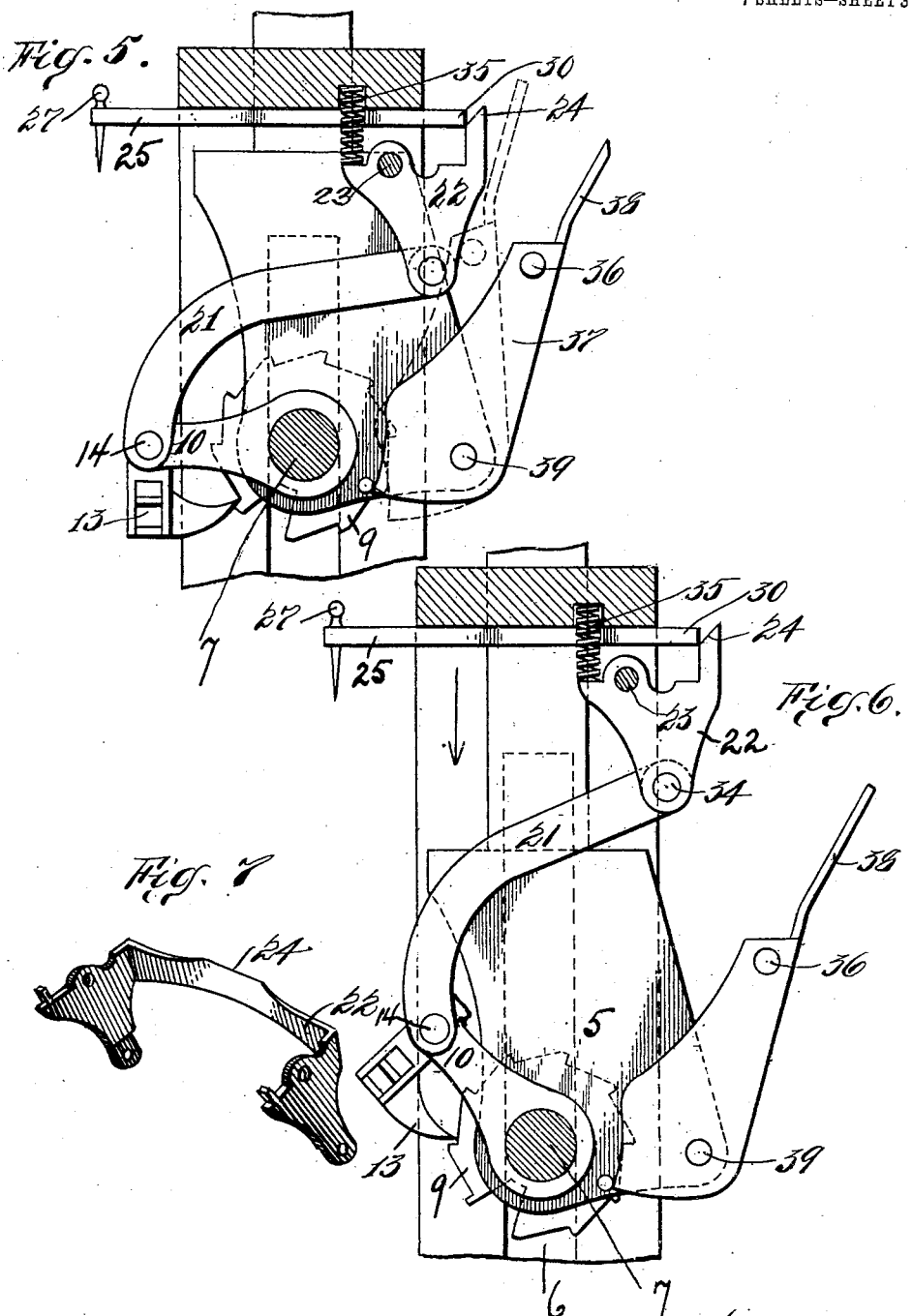

B. B. CONRAD.
NUMBERING MACHINE.
APPLICATION FILED APR. 17, 1908.
905,987.
Patented Dec. 8, 1908.
7 SHEETS—SHEET 4.
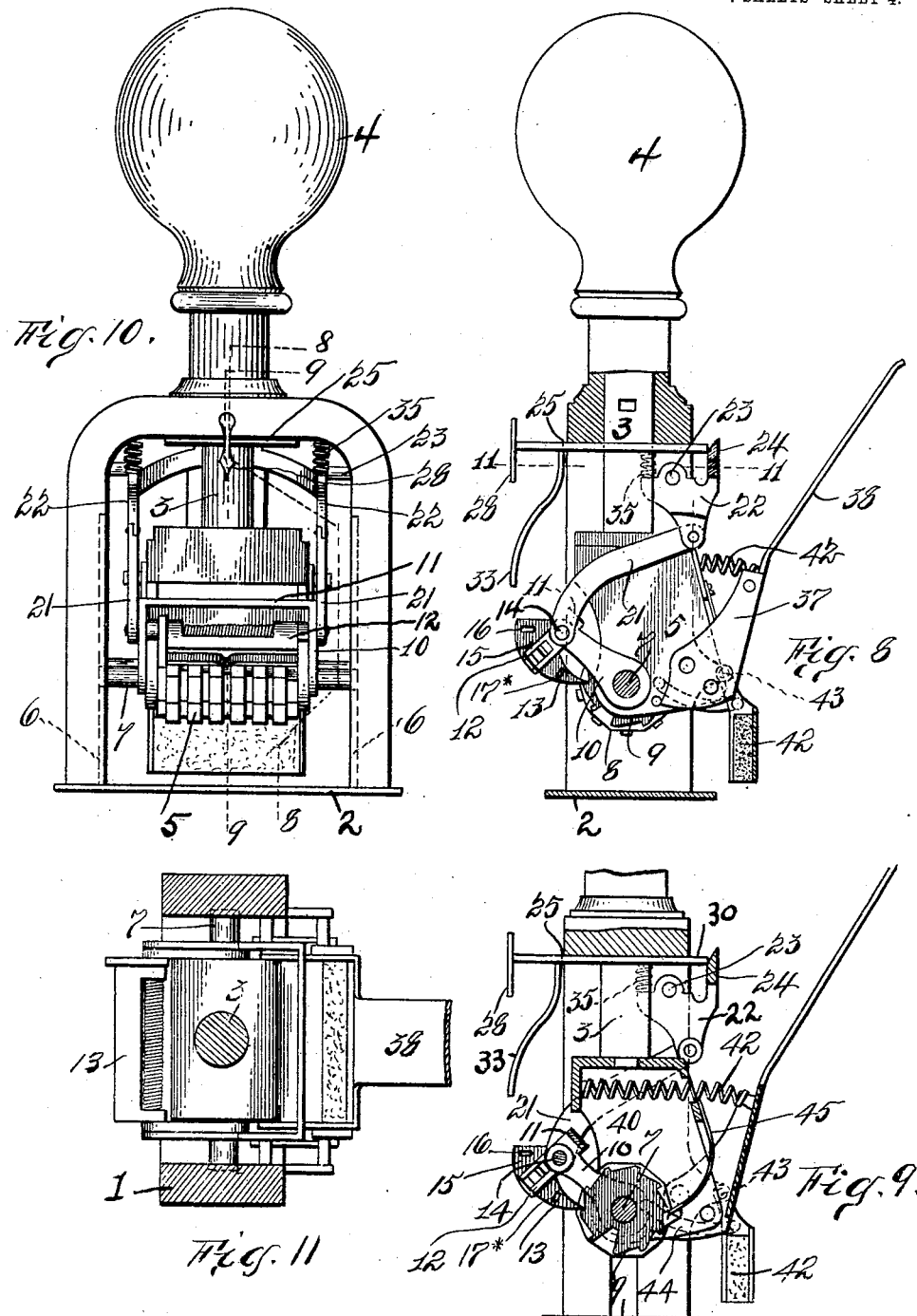
Witnesses:
E. A. Jarvis
Mabel Littenhoefer
Inventor:
Benjamin B. Conrad
By Chrystie and Wright,
Attorneys.

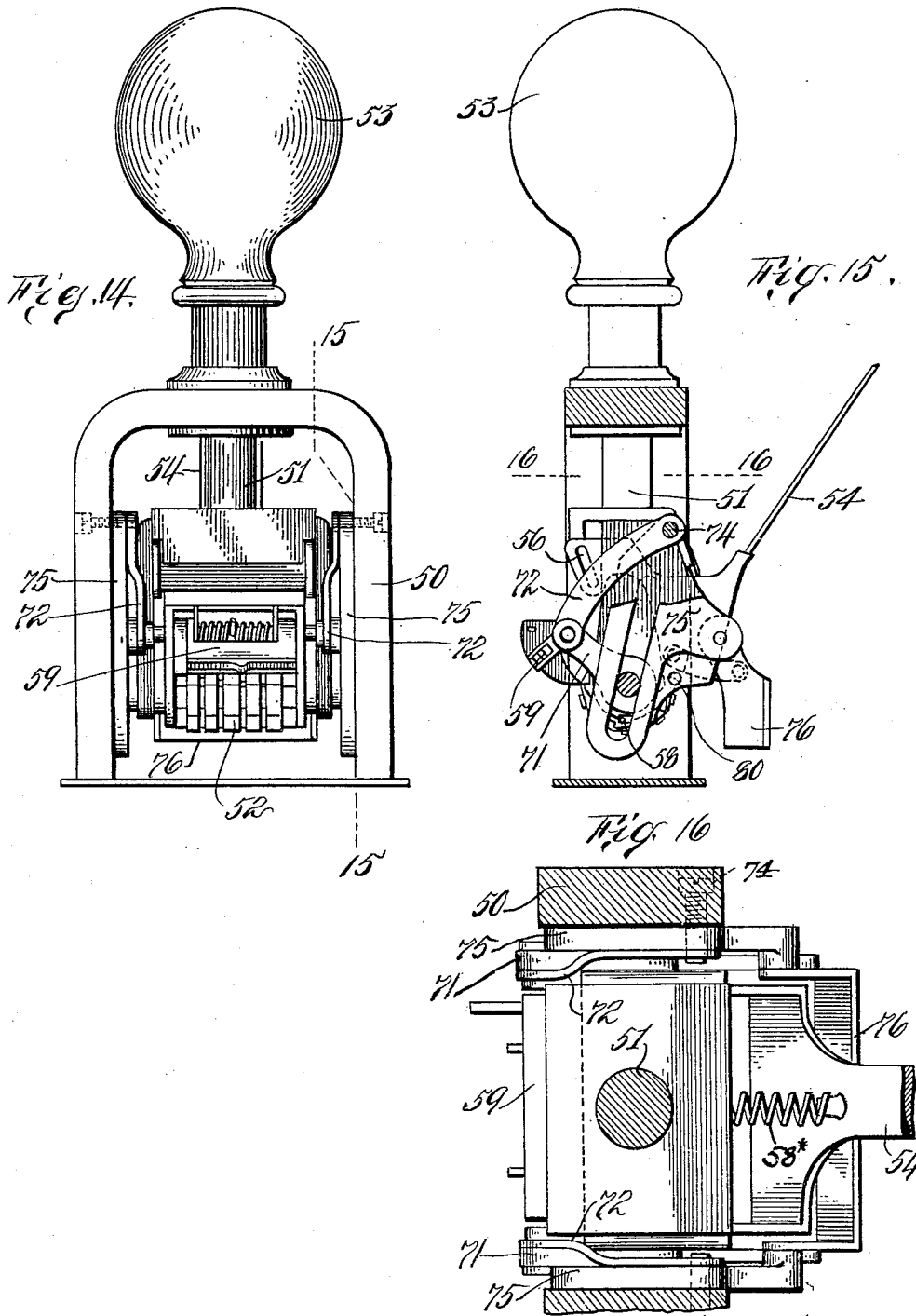

B. B. CONRAD.
NUMBERING MACHINE.
APPLICATION FILED APR. 17, 1908.

905,987.

Patented Dec. 8, 1908.
7 SHEETS—SHEET 6.

Witnesses:
C. A. Jarvis
Mabel Littenhoefer

Inventor
Benjamin B. Conrad
By Chrystie and Wright
his Attorneys

B. B. CONRAD.
NUMBERING MACHINE.
APPLICATION FILED APR. 17, 1908.
905,987.
Patented Dec. 8, 1908.
7 SHEETS—SHEET 7.
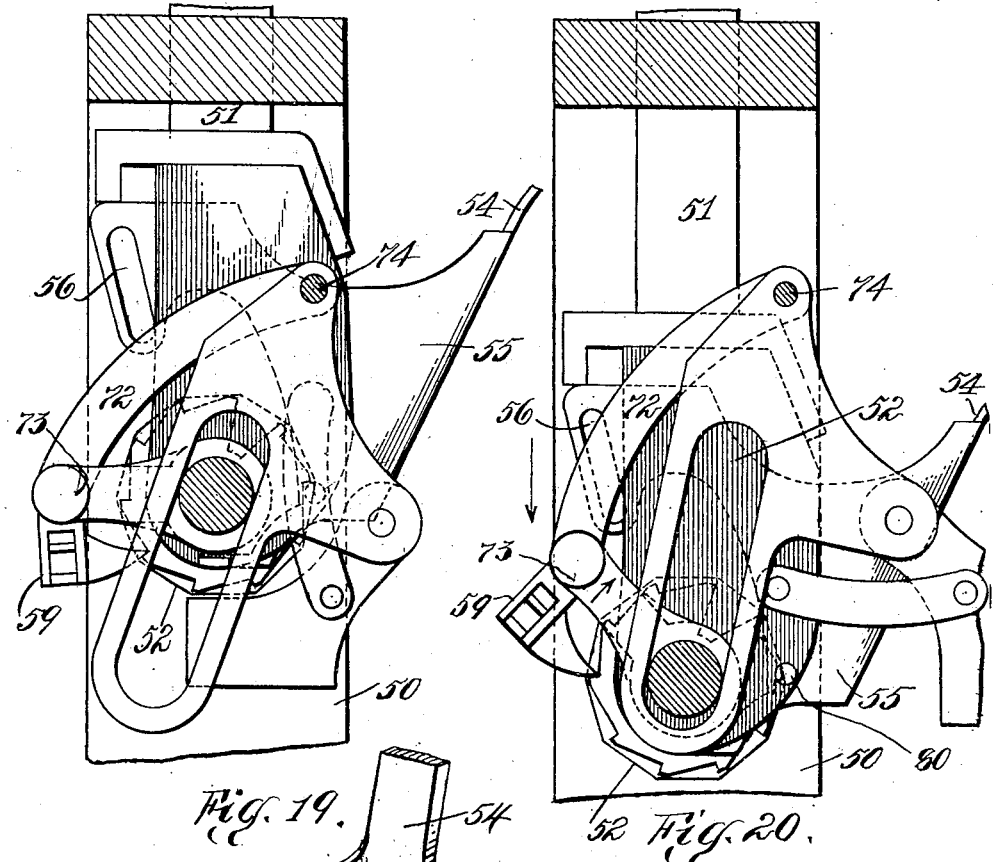
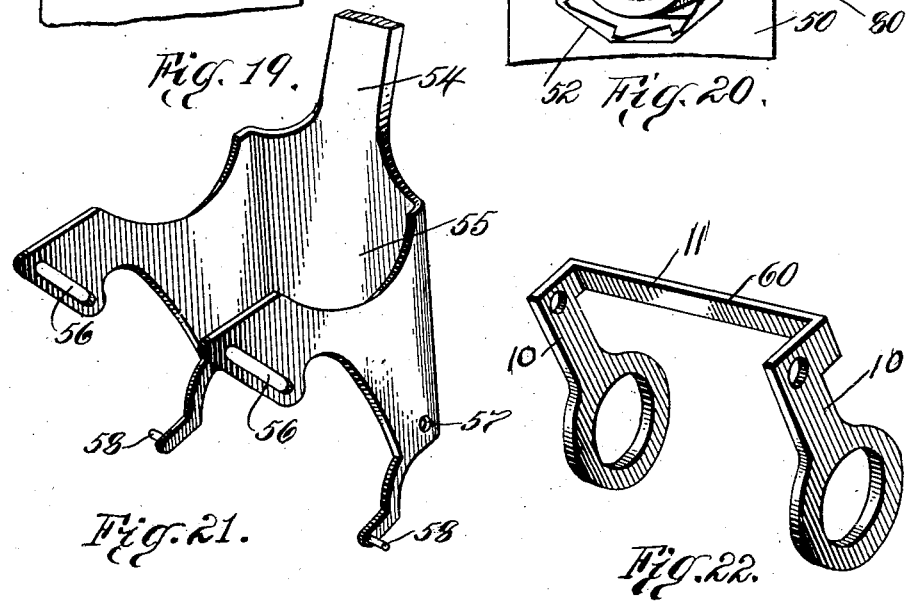

UNITED STATES PATENT OFFICE.

BENJAMIN B. CONRAD, OF BROOKLYN, NEW YORK, ASSIGNOR TO AMERICAN NUMBERING MACHINE COMPANY, A CORPORATION OF NEW YORK.

NUMBERING-MACHINE.

No. 905,987.      Specification of Letters Patent.      Patented Dec. 8, 1908.

Application filed April 17, 1908. Serial No. 427,603.

*To all whom it may concern:*

Be it known that I, BENJAMIN B. CONRAD, a citizen of the United States, residing at Brooklyn, New York, have invented certain new and useful Improvements in Numbering-Machines, of which the following is a clear, full, and exact description.

The object of this invention is to provide an improved hand numbering machine, which will combine the advantages of an automatic machine, that is one which will print consecutively, duplicate or perform other such changes of numbers automatically upon the depression of the plunger head of the machine, with means for throwing out of operation such automatic mechanism and putting into operation a hand or manually controlled mechanism to cause the changes of the numbers to be effected. Machines which produce either of the results mentioned heretofore are on the market today, but for the first time, I believe, I have incorporated in a single machine, mechanism which will permit the operator at will to change the operation of an individual machine from automatic to lever or vice versa.

The scope of my invention will be set forth in the claims.

Figure 1:
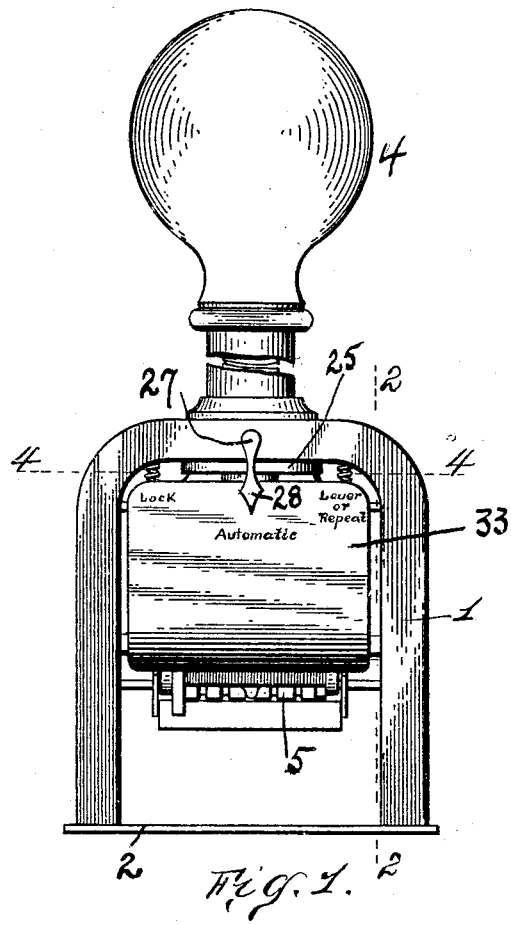
Figure 12:
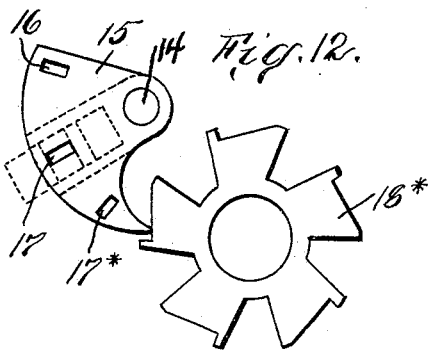
Figure 13:
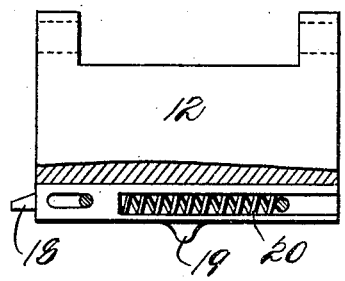
Figures 17, 18:
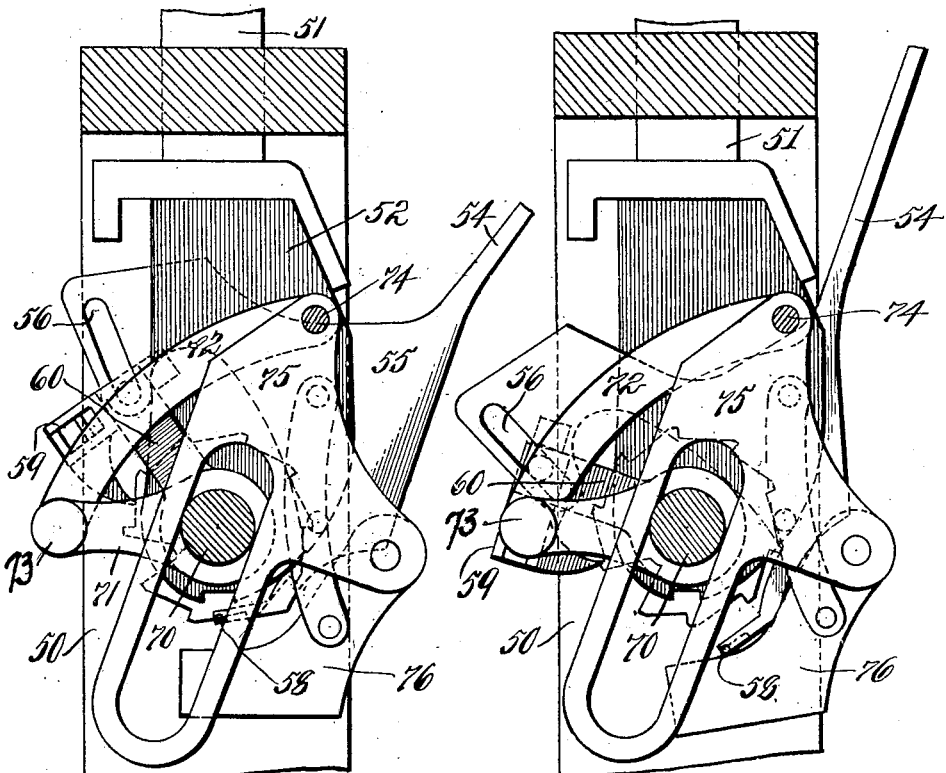
Figures 23, 24:
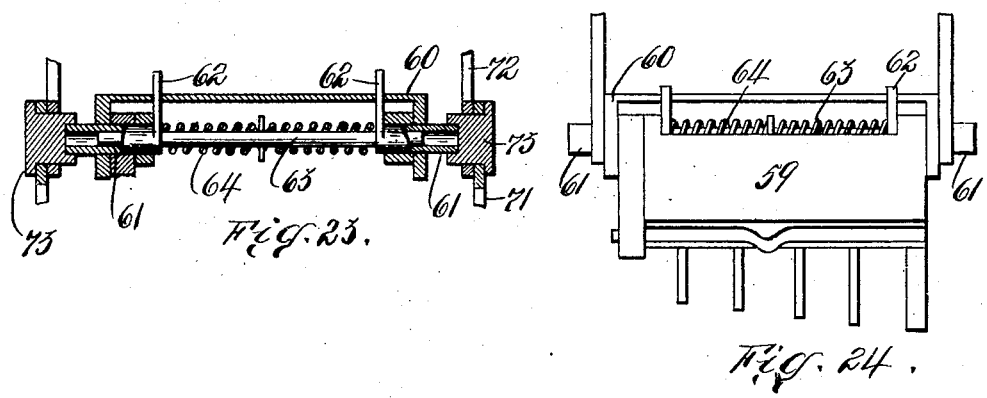

In the accompanying drawings: Figure 1 represents in front elevation a machine built according to my invention. Fig. 2 is a section of part of the machine drawn to a larger scale, on line 2—2, Fig. 1, illustrating the position of parts to make the machine a lever machine. Fig. 3 is a view similar to Fig. 2, showing the same parts as Fig. 2, but with the lever thrown over after advancing a wheel. Fig. 4 is an enlarged view on line 4—4 Fig. 1. Fig. 5 is a view similar to Fig. 2, but with the machine adjusted for automatic operation. Fig. 6 is a view similar to Fig. 5 with the plunger head depressed. Fig. 7 is a perspective view of the yoke upon which the cam acts to change the operation of the machine. Fig. 8 is a side view of the machine in section taken on line 8—8 Fig. 10. Fig. 9 is a section on line 9—9 Fig. 10. Fig. 10 is a front elevation with the front plate removed, and the plunger head partially down. Fig. 11 is a sectional view on line 11—11 Fig. 8. Fig. 12 is a detailed view of the mechanism for changing the character of the automatic operation. Fig. 13 is a detail partly in section of the pawl block. Fig. 14 is a front elevation of a modified type of machine. Fig. 15 is a section on line 15—15 of Fig. 14. Fig. 16 is a section on line 16—16 Fig. 15. Fig. 17 is an enlarged schematic side elevation of the operating parts of the machine in position for lever operation with the frame and shaft in section. Fig. 18 is a view similar to Fig. 17, showing the position of parts after the operation of the lever. Fig. 19 is a similar view showing this modified form of machine in a position for automatic operation. Fig. 20 is a similar figure to 19, showing the numbering head depressed. Fig. 21 is a perspective view of the shield with the lever shown broken off. Fig. 22 is a perspective view of the yoke for carrying the pawl block, of both types of machines described herein. Fig. 23 is a central sectional plan of that part of the pawl block mechanism adjacent to its shaft, and Fig. 24 is a plan of the pawl block mechanism.

As shown in Figs. 1 to 13, my improved machine consists of a U shaped frame 1 having affixed to its lower ends a gage plate 2. Through the upper part of the frame 1 there extends a shank 3, surmounted by a handle or knob 4. This shank 3 carries a numbering head 5, which is guided during its up and down movements, in slots 6 of the frame, its shaft 7 acting as a guide. On the shaft 7 are the usual numbering wheels 8, and their ratchets 9. Arms 10 pivoted on the shaft 7 and shown in perspective in Fig. 22 carry at their outer ends the pawl block mechanism. The arms 10 are joined by a transverse rod or bar 11. The pawl block mechanism consists of a plate 12 pivoted between the arms 10 and provided with downwardly depending pawl teeth 13 of the usual construction. The pawl block 12 is mounted on a shaft 14 which is itself secured to the arms 10. On the shaft 14 there is freely pivoted a segment 15 provided with notches 16, 17 and 17* as is quite common in the art. On the shaft 7 of the machine, there is mounted a loose ratchet wheel 18* having deep and shallow notches around its periphery. A bolt 18 controlled by a knob 19 and held in the position in which it is shown in Fig. 13 by a spring 20 is adapted to engage notch 16 or 17 or 17* of the segment 15, so as to permit the pawl block 12 to be held free of the ratchet wheels 9, when the bolt 18 engages the slot 16. When it is desired to produce duplicate numbering, the bolt 18 is shot into the slot 17, in which case the segment 15 will ride first on the shallow notch and then on the deep notch of the loose ratchet wheel 18*. When the bolt is shot into the slot 17* the segment 15 will be thrown out of operation, and the machine will number consecutively. All the matters heretofore described are well known in the numbering machine art, and do not differ in operation from machines shown in many prior patents. The arms 10, which carry the pawl block, are each of them pivoted to a link 21, which in turn is pivoted to a yoke piece 22, which is permanently pivoted at 23 to the frame of the machine. The yoke piece has an upstanding end 24, which comes opposite a cam 25, pivoted at 26 to the frame. The cam 25 is provided with an operating handle 27, and index pointer 28. It is provided with a slot 29, see Fig. 4, and with an extending arm 30. It has a straight side 31 adapted in "lock" position to engage a slot 32 in the plunger rod 3. A face plate 33 at the front of the machine is supplied with legends reading "lock" "automatic" "lever or repeat". When the index pointer 28 is moved to the position of "lock" the straight side 31 may be caused to engage the slot 32 of the machine's plunger rod, when the numbering head is depressed, so that ink pads may be changed or wheels manipulated by hand, as is the custom. When the pointer points to the word "Automatic" the machine will be in the position of Figs. 5, 6, and 8 where the arm 30 of the cam will force away from the frame the upstanding extension 24 of the yoke 22, compressing the springs 35 to a slight degree.

Upon depressing the numbering head from the position of Fig. 5 to that of Fig. 6, it will be seen that the pawl 13 will have slid to the next ratchet tooth as shown in that figure. Upon the upward movement of the numbering head 5, which as in all machines of this character, is spring-controlled, the pawl 13 will be forced down and rotate the number wheel, which it may advance a distance of a ratchet tooth. It will be seen that pressure on the pivot 34 on the upward movement of the head will be between the pivot point 23 and the upstanding end 24 of the yoke, thus there will be no tendency to oscillate the yoke and it will be for the time being a permanent and stationary pivot point for the link 21, therefore automatic operation of the machine will be secured so long as the index points to the word "Automatic." The character of the automatic operation will be determined by the position of the segment 15 and the pawl 18 as heretofore described, so that duplicate, consecutive or repeat numbering may be secured, or any other according to the configuration of the loose ratchet wheel employed.

When the index pointer 28 points to the words "Lever" or "Repeat" the parts will assume the position of Figs. 2 and 3. The rod 30 of the cam 25 will be out of the way of the yoke 22, and the springs 35 will press the pivot point 34 well to the right, so that the yoke itself will come well within the path of studs 36 on a shield 37, to which shield is attached the lever 38. The shield 37 is pivoted at 39 to side plates 40 of the numbering head, and its outward movement is limited by stop pins 41 on the plate. A spring 42 tends always to hold the shield in the position of Fig. 9. When the parts are in the position of Figs. 2 and 3, upon moving the lever from the dotted position of Fig. 3 to the full line position of that figure, it will be seen that the yoke will be oscillated, springs 35 compressed, the pivot points 34, which were stationary during the automatic operation, will be thrown forward, the links 21, due to this forward movement, will rotate a number wheel ratchet 9, the distance of one tooth, and upon the release of the lever 38 the springs 35 and 42 will return the parts to the position of Fig. 2. During the downward travel of the numbering head when in the position of Figs. 2 and 3, no operation, i. e. no automatic operation will be achieved for the following reason. Upon forcing the knob 4 and the numbering head 5 downward the cross bar 11 of the arms which carry the pawl block 12 will impinge upon the edge of the side plates 40 of the machine, and consequently the pawls will not be moved any material distance on the ratchet teeth. The pivot point 34 however, through the link 21 will be pulled forward by the downward movement of the plunger head, but the only effect that this will produce will be to compress the springs 35. Upon the upward movement of the plunger head the wheels will not be advanced because the springs 35, as the head rises, will push the pivot point 34 back to the position of Fig. 2, without causing movement of the pawl block.

It will thus be seen, that according to the position of the cam, the machine can be caused to automatically change the numbers or the change of the numbers may be left to the manual control of the operator as may be desired. The inking pad 42 may be pivoted to the frame at 43, and connected by links 44, to the side plates 40 of the machine, as is usual in machines of this type.

In preference for the sake of uniformity, and ease of operation, I locate two springs 35, one at each side of the numbering head, and I provide duplicate sets of links 21 to connect with the yoke 22. Usual detaining pawls 45 may be used, and in fact the machine may be constructed like any ordinary numbering machine, except that the pivot point for the link 21 is adapted to be held stationary for the automatic operation, and is made freely movable for lever operation, the cam being provided to select which operation shall be the prevailing one at the instant.

In the modification shown in Figs. 14 to 25, instead of providing a cam which, upon its mere shift, will change the pivot point of the levers controlling the movement of the pawl frame, I provide positive means for locking into operative position either the lever means or the automatic mechanism. Briefly it consists of a latch adapted to be disconnected from the automatic links and connected directly with the lever or vice versa.

The machine comprises a U frame 50, a rod 51 secured to the numbering head 52, a knob 53 surmounting the rod 51. The lever 54 terminates in a shield 55 having slots 56 in its side arms, pivot points 57 and lugs 58, see Fig. 21. The shield is pivoted to the numbering head at 80 and the spring 58* normally keeps it in the position of Figs. 15 and 16.

The pawl block 59 is mounted on the freely swinging bracket 60 see Fig. 22, by means of hollow sleeves 61 having handles 62. The shaft 63 on which the block 59 is hung passes into said sleeves, at each end, but the sleeves extend beyond the sides of the bracket 60 (see Fig. 23). Springs 64 tend always to hold the sleeves in the position of Fig. 23.

On the number wheel shaft 70 arms 71 are freely pivoted to which arms links are pivoted by a cup shaped pin 73 into which the sleeves may enter. The links 72 are pivoted to the frame at 74 by a pin passing through a slotted plate 75 to which is secured the ink pad holder 76.

In the position heretofore described the device is an automatic machine. In order to make the machine a lever machine the handles of the sleeves are grasped and moved to disengage the cup pins 73 and caused to enter the slots in the shield of the lever, so that the operation of the lever alone will operate the pawl block.

The pins 58 on the shield are to cause the ink pad 76 to be moved away from the wheels before they are rotated.

Although I have shown in Figs. 14 to 24 a modified form of machine which comes within the broad claims of this application, and for which I have made no specific claim herein, nevertheless I do not abandon my right to apply for a specific patent for such construction in another application in good time.

I claim as my invention:

1. The herein described numbering machine comprising a frame, a plunging head, said plunging head having wheels and ratchets, pawl mechanism adapted to advance the wheels when actuated, a lever adapted for hand operation, means adapted to automatically control the operation of the pawls and means for preventing the operation of the hand lever when the machine is set for automatic operation.

2. The herein described numbering machine comprising a frame, a plunging head, said plunging head having wheels and ratchets, pawl mechanism adapted to advance the wheels when actuated, a lever adapted for hand operation, means adapted to automatically control the operation of the pawls and means for rendering inert either the automatic means of operation or the hand lever, said means comprising a cam, an operating handle therefor extending beyond the frame, a plate in front of which said lever extends, and legends on said plate.

3. The herein described numbering machine comprising a frame, a plunging head, said plunging head having wheels and ratchets, pawl mechanism adapted to advance the wheels when actuated, a lever adapted for hand operation, means adapted to automatically control the operation of the pawls and means for rendering inert either the automatic means of operation or the hand lever, the means for operating said pawls comprising a system of levers connected between the plunging head and the frame of the machine, said hand lever adapted upon its manipulation to abut against and operate said system of levers, said means of control being adapted to prevent the operation by said hand lever of the system of levers, and in so preventing the operation of the hand lever adapted to so position the series of levers with relation to the plunging head and frame that upon the reciprocation of the plunging head the pawls will be caused to automatically operate.

4. The herein described numbering machine comprising a frame, a plunging head, said plunging head having wheels and ratchets, pawl mechanism adapted to advance the wheels when actuated, a lever adapted for hand operation, means adapted to automatically control the operation of the pawls and means for preventing the operation of the hand lever when the machine is set for automatic operation and means carried by the plunging head to control the character of operation of the automatic movement.

5. The herein described numbering machine comprising a frame, a plunging head, said plunging head having wheels and ratchets, pawl mechanism adapted to advance the wheels when actuated, a lever adapted for hand operation, means adapted to automatically control the operation of the pawls and means for rendering inert either the automatic means of operation or the hand lever, said means comprising a cam, an operating handle therefor extending beyond the frame, a plate through which said lever extends and legends on said plate, and means carried by the plunging head to control the character of operation of the automatic movement.

6. The herein described numbering machine, comprising a frame, a plunging head, said plunging head having wheels and ratchets, pawl mechanism adapted to advance the wheels when actuated, a lever adapted for hand operation, means adapted to automatically control the operation of the pawls and means for rendering inert either the automatic means of operation or the hand lever, the means for operating said pawls comprising a system of levers connected between the plunging head and the frame of the machine, said hand lever adapted upon its manipulation to abut against and operate said system of levers, said means of control being adapted to prevent operation by said hand lever of the system of levers and in so preventing the operation of the hand lever adapted to so position the series of levers with relation to the plunging head and frame that upon the reciprocation of the plunging head the pawls will be caused to automatically operate, and means carried by the plunging head to control the character of operation of the automatic movement.

7. A numbering machine comprising a frame, a reciprocating head carrying a shaft and number wheels, a pawl block carried on links pivoted to said head, links pivoted to said pawl block at one end and to the frame at another end, a hand lever adapted to operate said links and the pawl block, means for limiting the motion of said links where they are attached to the frame, whereby either the hand lever or the automatic control of the machine may be secured by manipulation of said means.

8. A numbering machine comprising a frame, a reciprocating head, numbering mechanism thereon, means for automatically advancing the numbering mechanism upon reciprocation of said head, means for manually advancing said numbering mechanism, said means comprising a hand lever, means for selecting at will the automatic mechanism or the lever mechanism, and means for preventing the operation of the hand lever when the machine is set for automatic operation.

9. A numbering machine comprising a frame, a reciprocating head, numbering mechanism thereon, a pawl block, pawls thereon, numbering wheels, ratchets therefor, means for automatically actuating the pawl block upon reciprocation of said head, means for manually actuating said pawl block to advance the ratchets, and means for selecting at will either the automatic means or the manually advancing means.

10. A numbering machine comprising a frame, a reciprocating head, numbering mechanism thereon, a pawl block, pawls thereon, numbering wheels, ratchets therefor, means for automatically actuating the pawl block upon the reciprocation of said head, means for manually actuating said pawl block to advance the ratchets, means for selecting at will either the automatic means or the manually advancing means, and means for preventing the operation of the automatic mechanism when the machine is set for manual operation.

Signed at New York city this 15th day of April 1908.

BENJAMIN B. CONRAD.

Witnesses:
F. WARREN WRIGHT,
MABEL DUTTENHOEFER.